(12) United States Patent
Steres et al.

(10) Patent No.: US 7,774,236 B2
(45) Date of Patent: Aug. 10, 2010

(54) DRIVE-THROUGH ORDER MANAGEMENT METHOD

(75) Inventors: Jeffrey M. Steres, Chicago, IL (US); John J. Bresnahan, III, Westmont, IL (US); Connie Justis, Plainfield, IL (US); Andrea Williams, Naperville, IL (US); Daniel Lyznicki, Oswego, IL (US); Elisabeth Sebourn, Berkeley, IL (US)

(73) Assignee: Restaurant Technology, Inc., Oak Brook, IL (US)

( * ) Notice: Subject to any disclaimer, the term of this patent is extended or adjusted under 35 U.S.C. 154(b) by 0 days.

(21) Appl. No.: 11/187,457

(22) Filed: Jul. 22, 2005

(65) Prior Publication Data
US 2007/0022016 A1 Jan. 25, 2007

(51) Int. Cl.
*G06Q 30/00* (2006.01)
(52) U.S. Cl. .......................... 705/26; 705/15
(58) Field of Classification Search .............. 705/26, 705/27, 15
See application file for complete search history.

(56) References Cited

U.S. PATENT DOCUMENTS

| | | |
|---|---|---|
| 3,304,416 A | 2/1967 | Wolf |
| 3,836,755 A | 9/1974 | Ehrat |
| 3,946,220 A | 3/1976 | Brobeck et al. |
| 4,373,133 A | 2/1983 | Clyne et al. |
| 4,388,689 A | 6/1983 | Hayman et al. |
| 4,392,119 A | 7/1983 | Price et al. |
| 4,396,985 A | 8/1983 | Ohara |
| 4,530,067 A | 7/1985 | Dorr |
| 4,661,908 A | 4/1987 | Hamano et al. |
| 4,676,343 A | 6/1987 | Humble et al. |
| 4,843,547 A | 6/1989 | Fuyama et al. |
| 4,879,650 A | 11/1989 | Kurimoto et al. |
| 4,935,720 A | 6/1990 | Kalfoun |
| 5,083,638 A | 1/1992 | Schneider |
| 5,128,862 A | 7/1992 | Mueller |
| 5,132,914 A | 7/1992 | Cahlander et al. |
| 5,172,328 A | 12/1992 | Cahlander et al. |
| 5,191,749 A | 3/1993 | Cappi et al. |
| 5,370,252 A | 12/1994 | Parsons |
| 5,375,680 A | 12/1994 | Ikeda et al. |
| 5,377,097 A | 12/1994 | Fuyama et al. |

(Continued)

FOREIGN PATENT DOCUMENTS

CA 2044467 5/1995

(Continued)

OTHER PUBLICATIONS

Matt Richtel. The long distance journey of a fast food order. Apr. 11, 2006. The New York Times, p. Al.*

*Primary Examiner*—Jason Dunham
(74) *Attorney, Agent, or Firm*—James P. Muraff; Neal, Gerber & Eisenberg LLP (57) ABSTRACT

A system and method for drive-through product order management. The system comprises a display and a processor. The display displays first customer product order information representative of a customer product order wherein the first customer product order information is positioned in a first position of the display. The processor correlates an indicator with the first customer product order information and positions the first customer product order information in a second position of the display.

9 Claims, 8 Drawing Sheets

U.S. PATENT DOCUMENTS

| | | |
|---|---|---|
| 5,488,202 A | 1/1996 | Baitz et al. |
| 5,497,314 A | 3/1996 | Novak |
| 5,602,730 A | 2/1997 | Coleman et al. |
| 5,864,824 A * | 1/1999 | Iguchi et al. .................. 705/15 |
| 5,898,158 A | 4/1999 | Shimizu et al. |
| 5,907,275 A | 5/1999 | Battistini et al. |
| 5,937,386 A | 8/1999 | Frantz |
| 5,974,393 A | 10/1999 | McCullough et al. |
| 5,987,428 A | 11/1999 | Walter |
| 6,026,372 A | 2/2000 | Savage |
| 6,049,780 A | 4/2000 | Fuyama |
| 6,088,681 A * | 7/2000 | Coleman et al. .............. 705/15 |
| 6,115,695 A | 9/2000 | Kern |
| 6,366,220 B1 * | 4/2002 | Elliott ....................... 340/928 |
| 6,661,997 B2 | 12/2003 | Ogo |
| 6,842,719 B1 | 1/2005 | Fitzpatrick et al. |
| 6,940,393 B2 * | 9/2005 | Dev et al. .............. 340/286.09 |
| 2002/0010632 A1 | 1/2002 | Iguchi et al. |
| 2002/0143638 A1 * | 10/2002 | August et al. ................. 705/26 |
| 2002/0143655 A1 * | 10/2002 | Elston et al. .................. 705/26 |
| 2002/0147647 A1 | 10/2002 | Ragsdale-Elliott et al. |
| 2002/0156682 A1 | 10/2002 | DiPietro |
| 2002/0174014 A1 | 11/2002 | Wittrup |
| 2003/0074239 A1 | 4/2003 | Hoffman et al. |
| 2003/0149633 A1 | 8/2003 | McConnell |
| 2003/0195821 A1 | 10/2003 | Kennamer |
| 2004/0035643 A1 | 2/2004 | Dev et al. |
| 2004/0138954 A1* | 7/2004 | Norton et al. ................. 705/16 |
| 2004/0143503 A1 | 7/2004 | Suthar |
| 2004/0158494 A1* | 8/2004 | Suthar ......................... 705/15 |
| 2004/0210474 A1 | 10/2004 | Hart et al. |
| 2004/0249497 A1 | 12/2004 | Saigh et al. |
| 2004/0260513 A1 | 12/2004 | Fitzpatrick et al. |
| 2005/0021407 A1 | 1/2005 | Karman |
| 2005/0049921 A1 | 3/2005 | Tengler et al. |
| 2005/0049940 A1* | 3/2005 | Tengler et al. ................. 705/27 |
| 2005/0059414 A1* | 3/2005 | Mahmoodi et al. ........ 455/456.2 |
| 2006/0218039 A1* | 9/2006 | Johnson ....................... 705/15 |
| 2006/0235755 A1* | 10/2006 | Mueller et al. ................. 705/15 |
| 2007/0088620 A1* | 4/2007 | Tengler et al. ................. 705/26 |
| 2007/0214053 A1* | 9/2007 | Salerno ....................... 705/15 |

FOREIGN PATENT DOCUMENTS

| | | |
|---|---|---|
| CA | 2219172 | 4/1999 |

* cited by examiner

DRIVE-THROUGH ORDER MANAGEMENT METHOD

CROSS-REFERENCE TO RELATED APPLICATIONS

Not applicable.

TECHNICAL FIELD

The invention generally relates to a system and method for product order management and more specifically to managing the work flow associated with drive-through lanes of a store.

BACKGROUND OF THE INVENTION

Drive-through service or curbside delivery is a common feature provided by businesses such as fast-food restaurants, banks, pharmacies and even coffee shops. The primary goal of such drive-through services is to provide a customer with fast and convenient service while increasing the number of customers that may be served than through conventional walk-in transactions.

Typically, a customer in a car approaches a microphone/speaker system contained in a menu board in a drive-through lane outside of a restaurant, bank, pharmacy, or coffee shop. The customer is prompted by an order-taker, through the speaker, to place an order. The customer dictates an order through the microphone. Generally, the order-taker wears a headset having a microphone and speaker to communicate with the customer placing the order. As the order is being placed or once the order has been taken, the order-taker enters the order information into a order management system. The order information is displayed on a display such that the order can be assembled by a runner.

One type of order management system displays customer order information in one of a plurality of positions sequenced from left to right across the display. As customer order information is inputted, it is placed in any open position on the screen. Once the order appears in that position, it stays in the same position until the order is removed from the display, i.e., the order is delivered to the customer. In the event that there is no open position, the order information is placed in a memory queue. Once a position opens up, the order information is placed in that position and will remain in that position until it is removed from the display, i.e., the order is delivered to the customer. The order information includes a colored header indicating the sequence that orders should be presented to the respective customer. These indicators change as orders are delivered to a customer and the customer product order information relating to that order is removed from the screen. Such static displays are difficult for presenters because they have to search the screen to determine which order is the next order to be presented as well as remember the priority of the colored headers.

In another type of order management system, the drive-through order queue is sequenced in a left-to-right format. As the first order is presented or delivered to the customer, it is bumped from the screen and the other orders shift to the left. This type of left-to-right display may reduce order accuracy and efficiency because the runner is forced to search the screen for the order they are filling while "filled" orders remain on the screen. In addition, there is no indication of the status of the order, such as whether it has been assembled, whether it is in the process of being assembled, or whether it needs to be or has been modified.

The present invention is provided to solve the problems discussed above and other problems, and to provide advantages and aspects not provided by prior systems of this type. A full discussion of the features and advantages of the present invention is deferred to the following detailed description, which proceeds with reference to the accompanying drawings.

SUMMARY OF THE INVENTION

The present invention relates to a drive-through product order management system. The system comprises a display and a processor. The display displays first customer product order information representative of a customer product order wherein the first customer product order information is positioned in a first position of the display. The processor correlates an indicator with the first customer product order information. The processor then positions the first customer product order information in a second position of the display.

The indicators are structured to indicate that the customer product order is in the process of being assembled, indicate that the customer product order has not been assembled, indicate that the customer product order was assembled, indicate that the customer product order was modified after the customer product order was assembled, indicate the priority of the customer product order, indicate a delay in delivering the customer product order and/or indicate that the first customer product order information has been positioned in the second position of the display.

The processor can receive a signal representative of a status change of the customer product order. In response, the processor can position the first customer product order information in the second position of the display, typically located to the left of the first position, or correlate another indicator with the first customer product order information.

The present invention further includes a method for managing a drive-through product order management system. In one embodiment, the method includes displaying a first customer product order information representative of a customer product order in a first position of the display, correlating an indicator with the first customer product order information and then positioning the first customer product order information in a second position of the display. The method further includes a step of receiving a signal representative of a status change of the customer product order and positioning the first customer product order information area in the second position of the display in response to receiving the signal representing the status change.

In another embodiment, the method includes displaying a first customer product order information representative of a first customer product order wherein the first customer product order information is positioned in a first customer product order first position of the display and displaying a second customer product order information representative of a second customer product order wherein the second customer product order information is positioned in a second customer product order first position of the display. The method further includes the steps of correlating a first indicator with the first customer product order information and a second indicator with the second customer product order information. The method also includes the steps of removing the first customer product order information and displaying the second customer product order information in a second customer product order second position of the display. The second customer product order second position may be positioned to the left of the second customer product order first position. The method further includes removing the second customer product order information from the second customer product order first position when the second customer information is positioned in the second customer product order second position.

In yet another embodiment, the method includes displaying a first customer product order information representative of a first customer product order in a first position of the display, receiving a second customer product order, and displaying a second customer product order information representative of the second customer product order in a second position of the display based on a placement criterion. Typically, the first position is located to the left of the second position of the display. The placement criterion positions the first customer product order information in the first position and places the second customer product order information in the second position based on at least one of a time the second customer product order was received and the availability of an open position on the display. Further, when an open position is unavailable, the second customer product order information is temporarily stored in a memory queue.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION

While this invention is susceptible of embodiments in many different forms, there are shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 1:
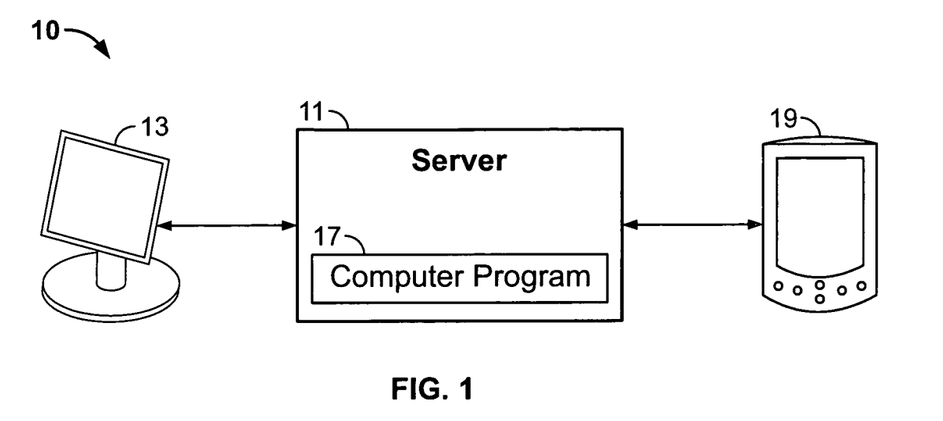
FIG. 1 illustrates a high level view of an order management system for managing work flow associated with drive-through lanes of a store according to the present invention.

FIG. 1 illustrates a high level view of an order management system 10 for managing the work flow associated with drive-through lanes of a store, such as a fast food restaurant or other store which sells food items or goods. The order management system 10 can be part of a point of sale (POS) system, as known to one of ordinary skill in the art, or separate therefrom. The order management system 10 has a server 11 with drive-through management software 17 running thereon. Additional general information about POS systems can be found in U.S. Pat. Nos. 3,946,220, 5,128,862, and 6,661,997 (and others), all of which are hereby incorporated by reference. The order management system 10 has one or more displays 13 for "runners" and "presenters." In the drive-through operation of the present invention, runners gather the items for orders placed in the drive-through lane(s) and presenters present the orders taken from cars which have placed an order in the drive-through lane or lanes (multiple parallel lanes). Once the runner is done gathering an order, the presenter will present the order. The presenter can also receive payment if presentation and payment is performed at the same window. The order management system 10 allows for increased efficiency through a clear interface display of the workflow process and the use of nonverbal communication.

The runners and presenters can wear or be near input devices 19 which communicate with the server 11 and the drive-through management software 17 causing various actions to occur, as will be described herein. The input devices 19 can be in a non-stationary position or a stationary position and have a wireless or wired connection to the order management system 10 running the drive-through management software 17. Preferably, the input devices 19 carried by the runners are wireless input devices and the input devices 19 carried by the presenters are stationary input devices. There may be multiple input devices 19 for the runners, presenters and other crew personnel. Also, the presenter and the runner can use the same display 13 or have different displays. Other embodiments having multiple runners and/or presenters are possible as well.

Figure 2:
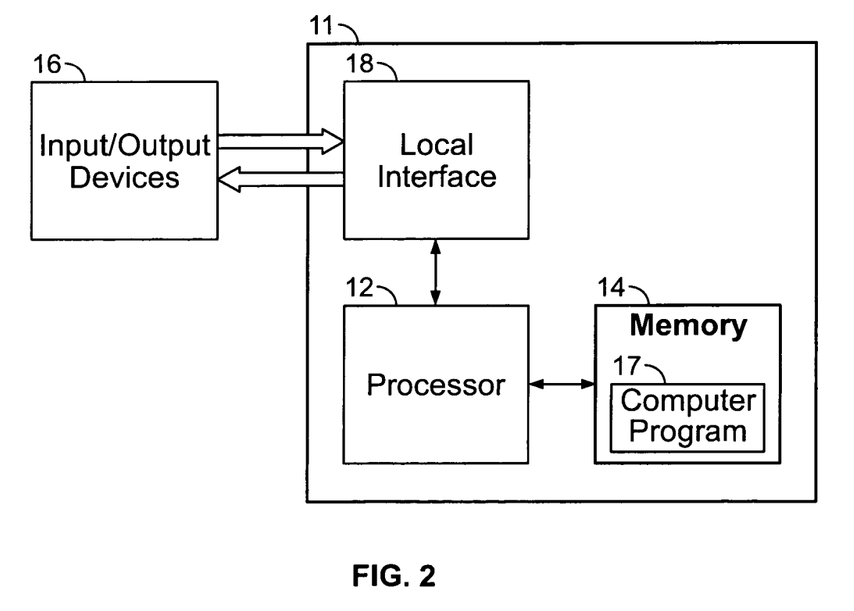
FIG. 2 is a block diagram of a computer used in connection with the present invention.

Generally, in terms of hardware architecture, as shown in FIG. 2, the server 11 includes a processor 12, memory 14, and one or more input and/or output (I/O) devices 16 (or peripherals) that are communicatively coupled via a local interface 18. The local interface 18 can be, but is not limited to, one or more buses or other wired or wireless connections, as is known in the art. The local interface 18 may have additional elements, which are omitted for simplicity, such as controllers, buffers (caches), drivers, repeaters, and receivers, to enable communications. Further, the local interface 18 may include address, control, and/or data connections to enable appropriate communications among the aforementioned components.

The processor 12 is a hardware device for executing software, particularly that stored in the memory 14. The processor 12 can be any custom-made or commercially available processor, a central processing unit (CPU), an auxiliary processor among several processors associated with the server 11, a semiconductor-based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc, or a 68xxx series microprocessor from Motorola Corporation.

The memory 14 can include any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 14 may incorporate electronic, magnetic, optical, and/or other types of storage media. Note that the memory 14 can have a distributed architecture, where various components are situated remote from one another, but can be accessed by the processor 12.

The software 17 in the memory 14 may include one or more separate programs, each of which has an ordered listing of executable instructions for implementing logical functions. In the example of FIG. 2, the software 17 in the memory 14 includes the order management system 10 in accordance with the present invention and a suitable operating system (O/S). A non-exhaustive list of examples of suitable commercially available operating systems is as follows: (a) a Windows operating system available from Microsoft Corporation; (b) a Netware operating system available from Novell, Inc.; (c) a Macintosh operating system available from Apple Computer, Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) a run time Vxworks operating system from WindRiver Systems, Inc.; or (g) an appliance-based operating system, such as that implemented in handheld computers or personal data assistants (PDAs) (e.g., PalmOS available from Palm Computing, Inc., and Windows CE available from Microsoft Corporation). The operating system essentially controls the execution of other computer programs, such as the order management system 10, and provides scheduling, input-output control, file and data management, memory management, and communication control and related services.

The order management system 10 may be a source program, an executable program (object code), script, or any other entity comprising a set of instructions to be performed. When the order management system 10 is a source program, the program needs to be translated via a compiler, assembler, interpreter, or the like, which may or may not be included within the memory 14, so as to operate properly in connection with the O/S. Furthermore, the order management system 10 can be written as (a) an object-oriented programming language, which has classes of data and methods, or (b) a procedure programming language, which has routines, subroutines, and/or functions, for example, but not limited to, C, C++, Pascal, Basic, Fortran, Cobol, Perl, Java, and Ada.

The I/O devices 16 may include input devices such as a keyboard, a mouse, a scanner, a microphone, etc. The I/O devices 16 may also include output devices such as a printer, the wireless devices 19, the display 13, etc. Finally, the I/O devices 16 may further include devices that communicate both inputs and outputs, for instance, but not limited to, a modulator/demodulator (modem; for accessing another device, system, or network), a radio frequency (RF) or other transceiver, a telephonic interface, a bridge, a router, etc. The I/0 devices 16 can be any custom-made or commercially available I/O devices.

If the server 11 is a PC, workstation, or the like, the software in the memory 14 may further include a basic input-output system (BIOS) (not shown). The BIOS is a set of essential software routines that initialize and test hardware at startup, start the O/S, and support the transfer of data among the hardware devices. The BIOS is stored in ROM so that the BIOS can be executed when the server 11 is activated.

When the server 11 is in operation, the processor 12 is configured to execute software stored within the memory 14, to communicate data to and from the memory 14, and to generally control operations of the server 11 pursuant to the software. The order management software 17 and the O/S 22, in whole or in part, but typically the latter, are read by the processor 12, perhaps buffered within the processor 12, and then executed.

When the order management system 10 is implemented in software 17, as shown in FIG. 2, it should be noted that the order management system 10 can be stored on any computer-readable medium for use by, or in connection with, any computer-related system or method. A computer-readable medium is any electronic, magnetic, optical, or other physical device or means that can contain or store a computer program for use by, or in connection with, a computer-related system or method. The order management system 10 can be embodied in any computer-readable medium for use by, or in connection with, an instruction execution system, apparatus, or device, such as a computer-based system, processor-containing system, or other system that can fetch the instructions from the instruction execution system, apparatus, or device, and execute the instructions. A computer-readable medium can be any means that can store, communicate, propagate, or transport the program for use by, or in connection with, the instruction execution system, apparatus, or device. For example, the computer-readable medium can be an electronic, magnetic, optical, electromagnetic, infrared, or semiconductor system, apparatus, device, or propagation medium. More specific examples (a non-exhaustive list) of computer-readable medium include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disk read-only memory (CDROM) (optical).

In an alternative embodiment, where the order management system 10 is implemented in hardware, the order management system 10 can utilize any one, or a combination of, the following technologies, which are each well known in the art: a discrete logic circuit(s) having logic gates for implementing logic functions upon data signals, an application-specific integrated circuit (ASIC) having appropriate combinational logic gates, a programmable gate array(s) (PGA), a field-programmable gate array (FPGA), etc.

Figure 3:
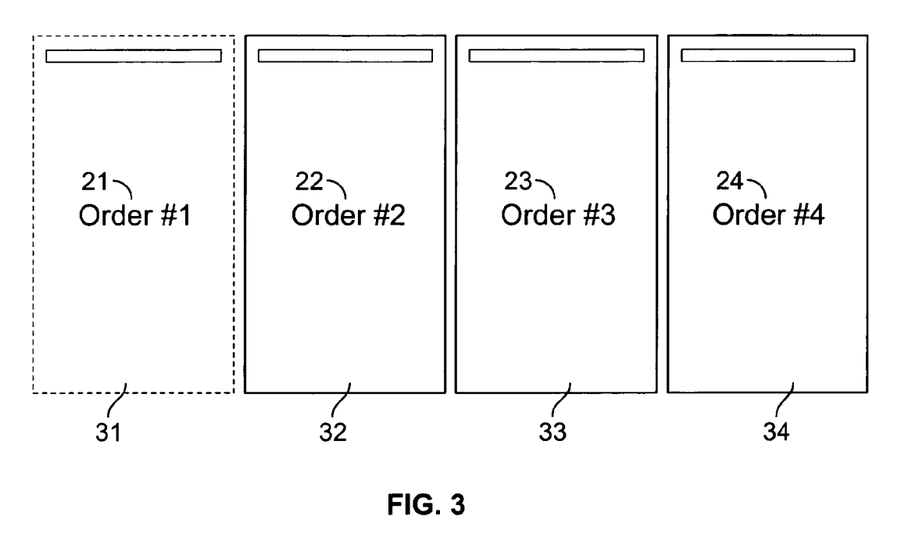
FIG. 3 illustrates a display of customer product order information according to the present invention.

As noted above, one or more displays 13 are communicatively coupled to the server 11 via the local interface 18 for displaying customer product order information 21, 22, 23, 24 representative of a customer order in a respective position 31, 32, 33, 34 of the display 13. As illustrated in FIG. 3, the customer product order information 21, 22, 23, 24 is sequenced from left to right. Unpaid orders are usually shown in the sequence based on when the orders are stored in the system. Paid orders are usually shown in the sequence based on when the orders are paid. Sequentially, paid orders will precede unpaid orders. This is true, regardless of the sequence the orders were started and regardless of the order number. Thus, in the display of FIG. 3, order #1 21 in the left position 31 was stored into the order management system 10 prior to order #2 22 in the left-center position 32. Similarly, order #2 22 was stored into the order management system 10 prior to order #3-23 in the right-center position 33. Finally, order #3 23 was stored into the order management system 10 prior to order #4 24 in the right position 34.

In the event that a new order is entered into the system and a position is not available, the customer product order information is stored in a memory queue until a position becomes available. Once a customer product order information, such as order #1 21, is removed from the screen and the other customer product order information is shifted, a position becomes available. The customer product order information previously stored in the memory queue is now displayed in the open position. Preferably, this open position is the right position 34.

Crew members, such as runners and presenters can take various actions on orders shown on the display(s). In one embodiment, the runner can indicate to the system the current order the runner is working on and select the next order in sequence to attend to or work on. This can be done as a part of a runner bump. As will be described below, an indicator on the display, which shows which order the runner is working on, will move or "bump" to another position. In another embodiment, the presenter can perform a presenter bump to indicate that an order has been presented or delivered to the customer. As will be described below, the order which the presenter presented or delivered to the customer will "bump" or be removed from the display(s), and all other orders will shift left on the display(s). In yet another embodiment, the runner, presenter and/or other crew members can take action which indicates to the system that at least one customer product order information has switched positions on the display before or while they are being assembled. In another embodiment, the runner, presenter and/or other crew members can take action which indicates to the system that at least one customer product order information has switched positions on the display after the runner has assembled the customer order. In yet another embodiment, the runner, presenter and/or other crew members can take action which indicates to the system that the current runner order should be "parked." Parking an order indicates that store personnel should inform a customer to park their car and the order will be brought out to their car instead of delivering the food to them through the drive-through window. In another embodiment, the runner, presenter, and/or other crew members can take action which indicates to the system that the content of the customer product order was modified.

Figure 4A:
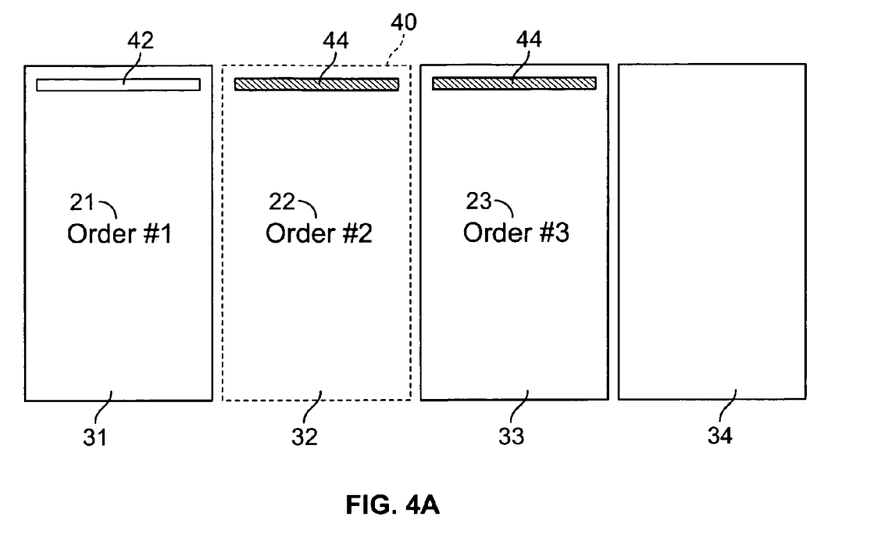
FIG. 4A illustrates a display of customer product order information before a runner bump according to the present invention.
Figure 4B:
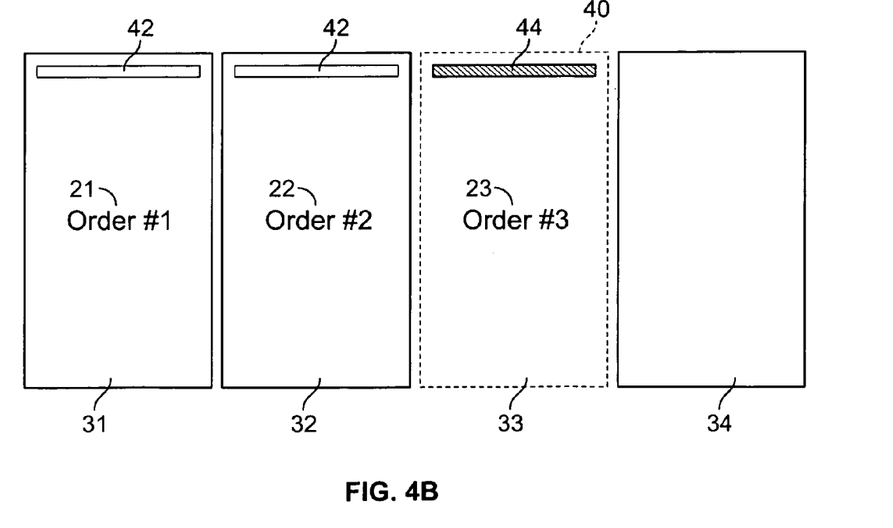
FIG. 4B illustrates a display of customer product order information after a runner bump according to the present invention.

FIG. 4A and FIG. 4B illustrate a runner bump in the order management system 10, showing the display 13 before the runner bump in FIG. 4A and the display 13 after the runner bump in FIG. 4B. In FIG. 4A, order #1 21 is in the left position 31, order #2 22 is in the left-center position 32 and order #3 23 is in the right-center position 33. Indicator 40 is correlated with order #2 22 indicating that the runner is currently working on order #2 22. Preferably, indicator 40 is a box surrounding the customer product order information shown on the display 13. Indicator 44 is also correlated with order #2 22 indicating that order #2 22 has not been assembled yet. This same indicator 44 is correlated with order #3 23 indicating that order #3 23 has not been assembled. Another indicator 42 is correlated with order #1 21 indicating that the order has been assembled and is ready to be presented or delivered to the customer.

Once the runner has assembled the customer order, the runner inputs this information to the order management system 10 through the input device 19. In response, the order management system 10 performs a runner bump, resulting in the display shown in FIG. 4B. Similar to FIG. 4A, order #1 21 is in the left position 31, order #2 22 is in the left-center position 32 and order #3 23 is in the right-center position 33. However, indicator 40 is now correlated with order #3 23 indicating that the runner is working on order #3 23. Indicator 44 is still correlated with order #3 23 indicating that the order has not been assembled. Finally, indicators 42 are correlated with order #1 21 and order #2 22 indicating that the orders have been assembled and are ready to be presented or delivered to the respective customer.

Figure 5A:
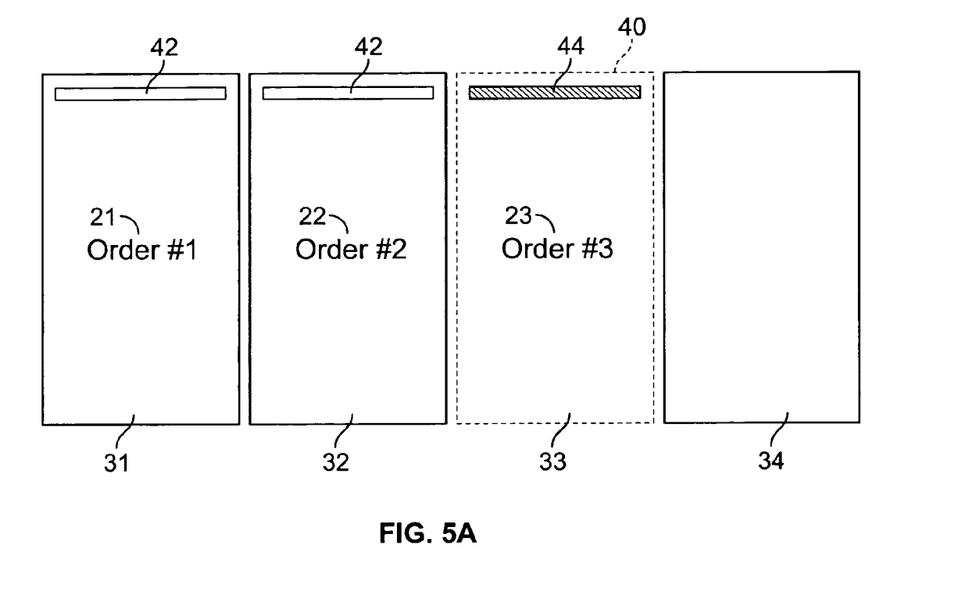
FIG. 5A illustrates a display of customer product order information before a presenter bump according to the present invention.
Figure 5B:
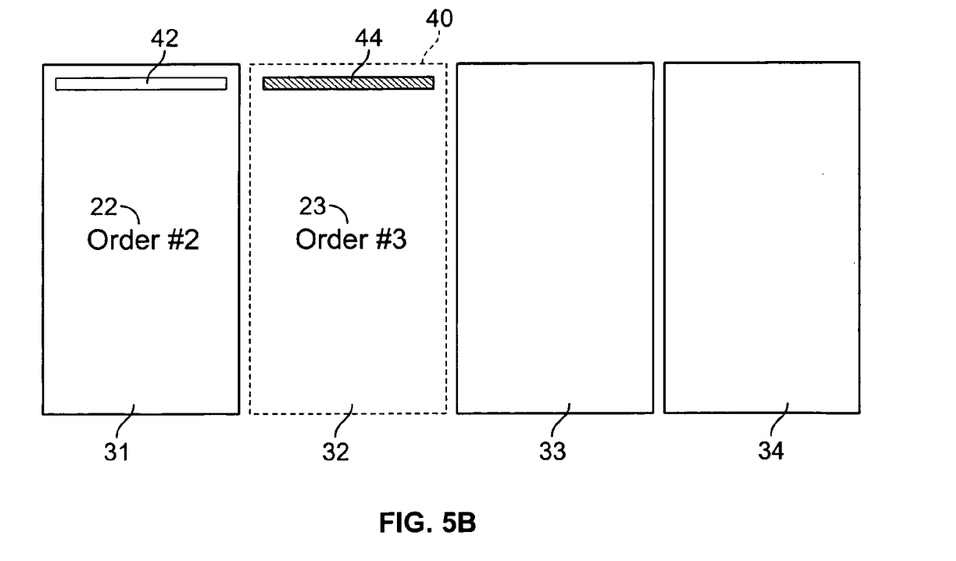
FIG. 5B illustrates a display of customer product order information after a presenter bump according to the present invention.

FIG. 5A and FIG. 5B illustrate a presenter bump in the order management system 10, showing the display 13 before the presenter bump in FIG. 5A and the display 13 after the presenter bump in FIG. 5B. In FIG. 5A, order #1 21 is in the left position 31, order #2 22 is in the left-center position 32 and order #3 23 is in the right-center position 33. Indicator 40 is correlated with order #3 23 indicating that the runner is currently working on order #3 23. Indicator 44 is also correlated with order #3 23 indicating that order #3 23 has not been assembled yet. Another indicator 42 is correlated with order #1 21 and order #2 22 indicating that the respective orders have been assembled and are ready to be presented or delivered to the respective customer.

Once the presenter presents or delivers the customer order represented by order #1 21, the presenter inputs this information to the order management system 10 through the input device 19. In response, the order management system 10 performs a presenter bump, resulting in the display shown in FIG. 5B. In FIG. 5B, order #1 21 has been removed from the display, and order #2 22 and order #3 23 have shifted one position to the left on the display 13. As a result, order #2 22 is displayed in the left position 31 and order #3 23 is displayed in the left-center position 22. Indicator 40 and indicator 44 are still correlated with order #3 23, respectively indicating that the runner is currently working on the order and the order has not been assembled yet. Further, indicator 42 is still correlated with order #2 22 indicating that order #2 22 is ready to be presented or delivered to the customer. Assuming that the right position was filled before the presenter bump and new customer product order information is stored in the memory queue and is not being displayed, it will now be displayed in the next available position to the right.

Figure 6A:
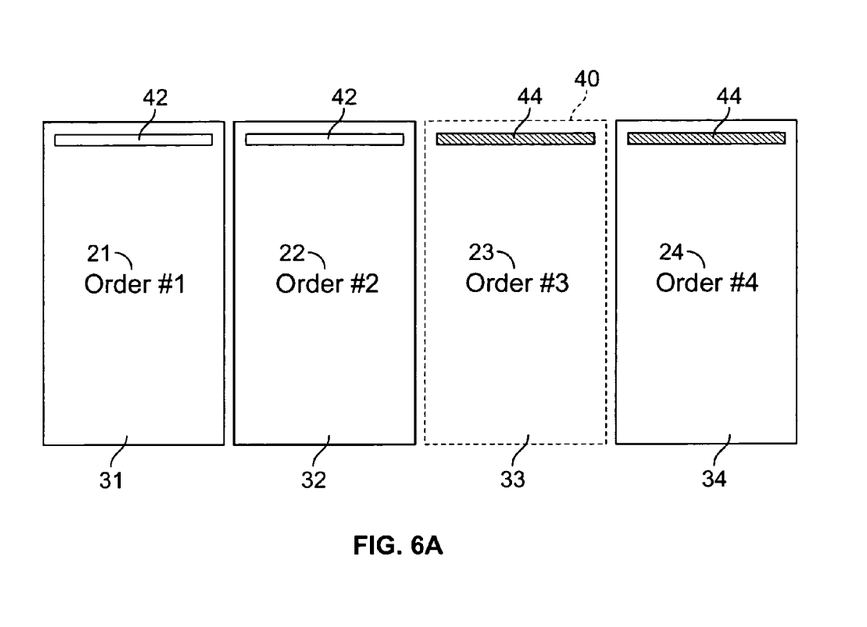
FIG. 6A illustrates a display of customer product order information before customer product order information changes positions while the customer order is being assembled according to the present invention.
Figure 6B:
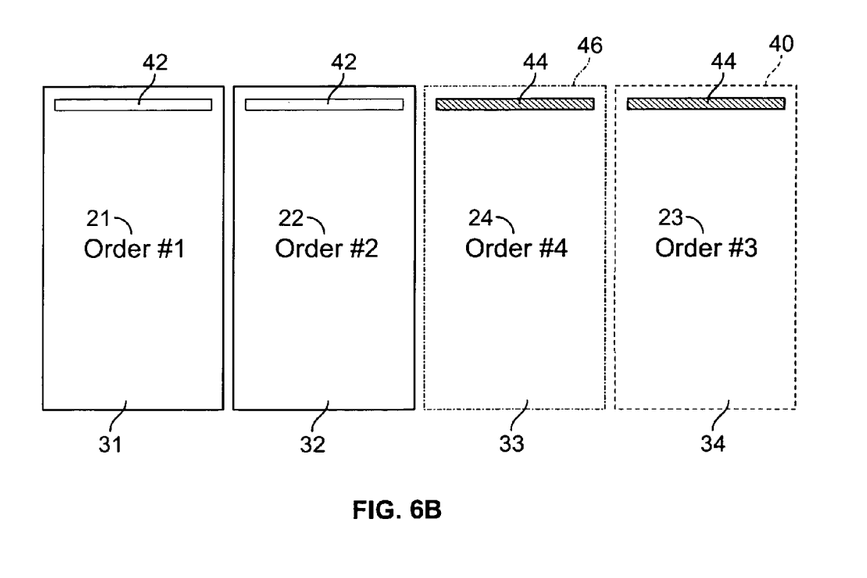
FIG. 6B illustrates a display of customer product order information after customer product order information changes positions while the customer order is being assembled according to the present invention.

FIG. 6A and FIG. 6B illustrate an embodiment in which customer product order information changes positions while a customer order is being assembled. An order may switch positions before it is assembled because it is of a higher priority than another order and needs to be assembled before another order. The order management system 10 determines whether an order is of a higher priority based on predetermined criteria. For example, an order maybe of a higher priority than another because it was paid for before the other order. FIG. 6A illustrates the display 13 before the order switches positions and FIG. 6B illustrates the display 13 after the order switches positions. In FIG. 6A, order #1 21 is in the left position 31, order #2 22 is in the left-center position 32, order #3 23 is in the right-center position 33, and order #4 24 is in the right position 34. Indicators 42 are correlated with order #1 21 and order #2 22 indicating that the respective orders are ready to be presented or delivered to the customer. Indicators 44 are correlated with order #3 23 and order #4 24 indicating that the respective orders have not been assembled yet. Indicator 40 is correlated with order #3 23 indicating that the runner is currently working on order #3 23.

The order management system determines that a customer product order information needs to switch positions based on a crew member action inputting information into the order management system 10 through the input device 19. In response, the order management system 10 switches the position of the customer product order information that needs to be switched. In FIG. 6B, order #3 23 and order #4 24 have switched positions as compared to FIG. 6A. As a result, order #3 23 in displayed in the right position 34 and order #4 24 is displayed in the right-center position 33. Indicators 44 are still correlated with order #3 23 and order #4 24 indicating that the respective orders have not been assembled yet. Further, indicator 40 is still correlated with order #3 23 indicating that the runner is currently working on order #3 23. In addition, indicator 46 is correlated with order #4 24 indicating that the order is of a higher priority than the order currently being worked on by the runner. This is an indication that the runner is working on, or is set to work on, an order which is not of the highest priority.

Figure 7A:
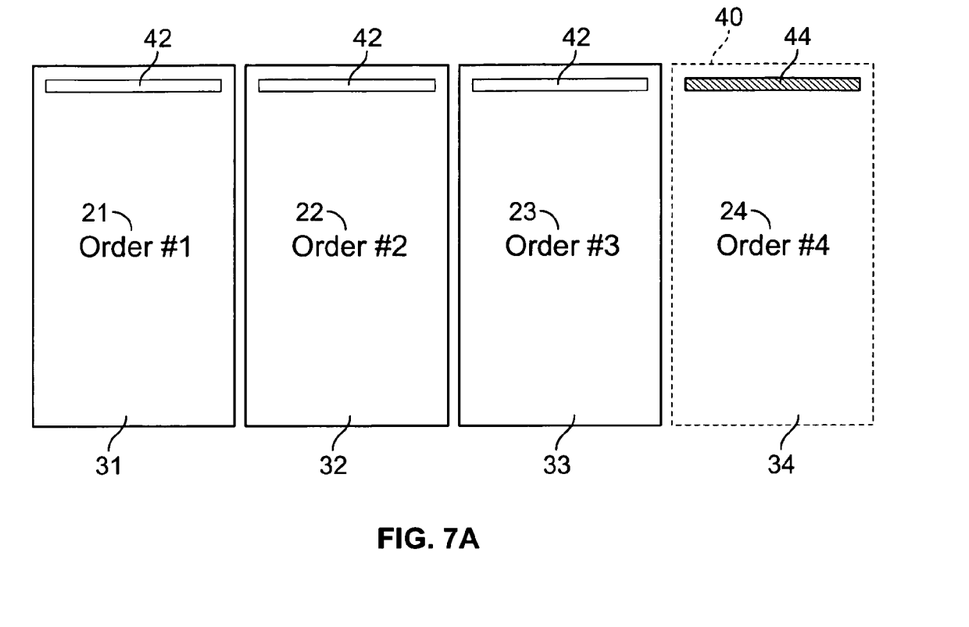
FIG. 7A illustrates a display of customer product order information before customer product order information changes positions after the customer order has been assembled according to the present invention.
Figure 7B:
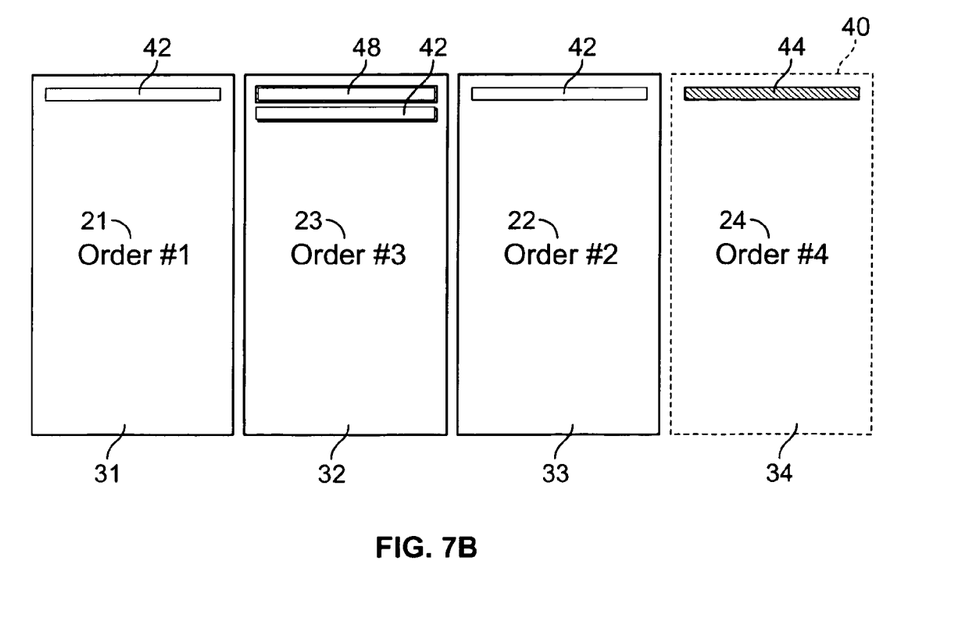
FIG. 7B illustrates a display of customer product order information after customer product order information changes positions after the customer order has been assembled according to the present invention.

FIG. 7A and FIG. 7B illustrate an embodiment in which customer product order information changes positions after a customer order has been assembled. An order may switch positions after it is assembled because it needs to be presented before another order. FIG. 7A illustrates the display 13 before the order switches positions and FIG. 7B illustrates the display 13 after the order switches positions. In FIG. 7A, order #1 21 is in the left position 31, order #2 22 is in the left-center position 32, order #3 23 is in the right-center position 33, and order #4 24 is in the right position 34. Indicators 42 are correlated with order #1 21, order #2 22 and order #3 23 indicating that the respective orders are ready to be presented or delivered to the customer. Indicator 44 is correlated with order #4 24 indicating that the order has not been assembled yet. Indicator 40 is also correlated with order #4 24 indicating that the runner is currently working on order #4 24.

The order management system 10 determines that a customer order needs to switch positions based on a crew member action inputting information to the order management system 10 through the input device 19. In response, the order management system 10 switches the position of the order that needs to be switched. In FIG. 7B, order #2 22 and order #3 23 have switched positions as compared to FIG. 7A. As a result, order #2 22 is displayed in the right-center position 33 and order #3 23 is displayed in the left-center position 32. Indicators 44 are still correlated with order #1 21, order #2 22 and order #3 23 indicating that the respective orders have been assembled and are ready to be presented or delivered to the customer. Further, indicator 40 is still correlated with order #4 24 indicating that the runner is currently working on order #4 24. Additionally, indicator 44 is still correlated with order #4 24 indicating that the order has not been assembled yet. In addition, indicator 48 is correlated with order #3 23 indicating that the order has been moved up in the sequence after the runner has completed assembling the order. Preferably, indicator 48 is flashing so as to easily draw attention to the display 13.

Figure 8A:
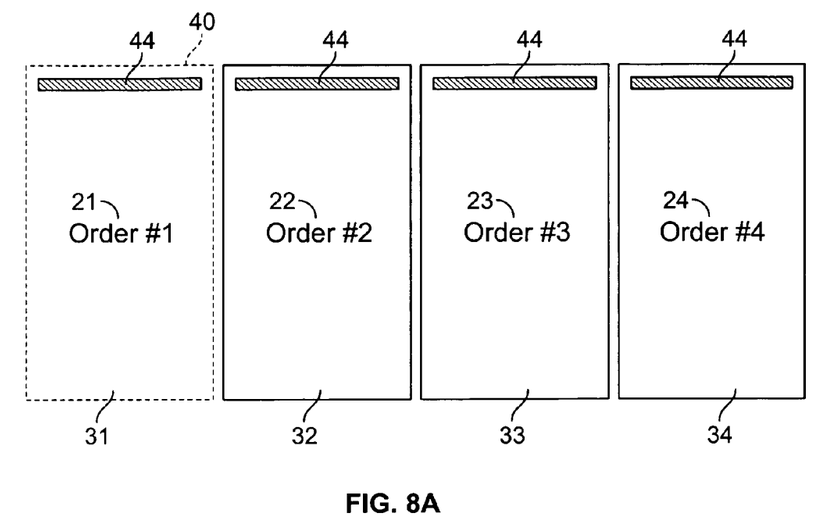
FIG. 8A illustrates a display of customer product order information before a customer order is held according to the present invention.
Figure 8B:
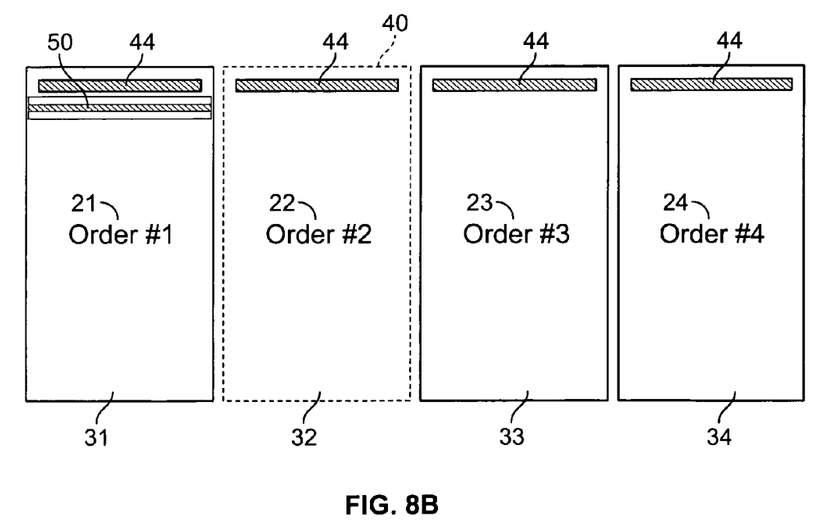
FIG. 8B illustrates a display of customer product order information after a customer order is held according to the present invention.

FIG. 8A and FIG. 8B illustrate an embodiment in which an order is not complete and the customer's car should be parked. A customer's car may need to be parked because the entire order, or a portion thereof, has not been assembled and must be held until it is assembled. FIG. 8A illustrates the display 13 before order #1 21 is held and FIG. 8B illustrates the display 13 after order #1 21 is held. In FIG. 8A, order #1 21 is in the left position 31, order #2 22 is in the left-center position 32, order #3 23 is in the right-center position 33, and order #4 24 is in the right position 34. Indicator 40 is correlated with order #1 21 indicating that the runner is currently working on the order. Further, indicators 44 are correlated with order # 1 21, order #2 22, order #3 23, and order #4 24 indicating that the respective orders have not been assembled yet.

The order management system 10 determines that a customer order, such as order #1 21, needs be held based on a crew member action inputting information to the order management system 10 through the input device 19. In response, the order management system 10 indicates the order is being held and the customer's car should be parked. In FIG. 8B, as compared to FIG. 8A, order #1 21 remains in the left position 31, order #2 22 remains in the left-center position 32, order #3 23 remains in the right-center position 33, and order #4 24 remains in the right position 34. Indicator 44 and indicator 50 are correlated with order #1 21 indicating that the order is not ready and needs to be held. Indicator 40 is now correlated with order #2 22 indicating that the runner is currently working on order #2 22. Indicators 44 are still correlated with order #2 22, order #3 23 and order #4 24 indicating that the orders have not been assembled yet.

Figure 9A:
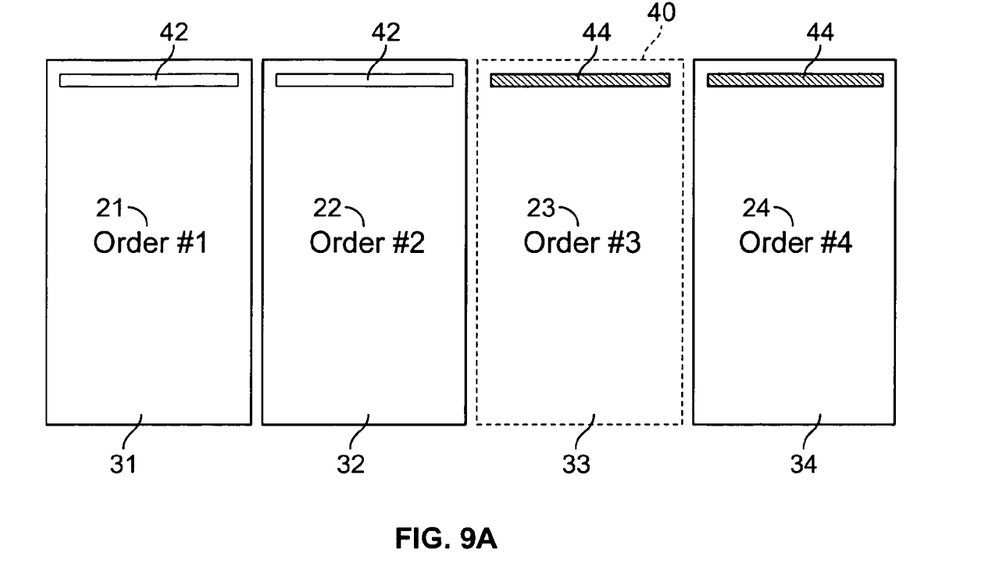
FIG. 9A illustrates a display of customer product order information before a customer order is modified according to the present invention; and, FIG. 9B illustrates a display of customer product order information after a customer order is modified according to the present invention.
Figure 9B:
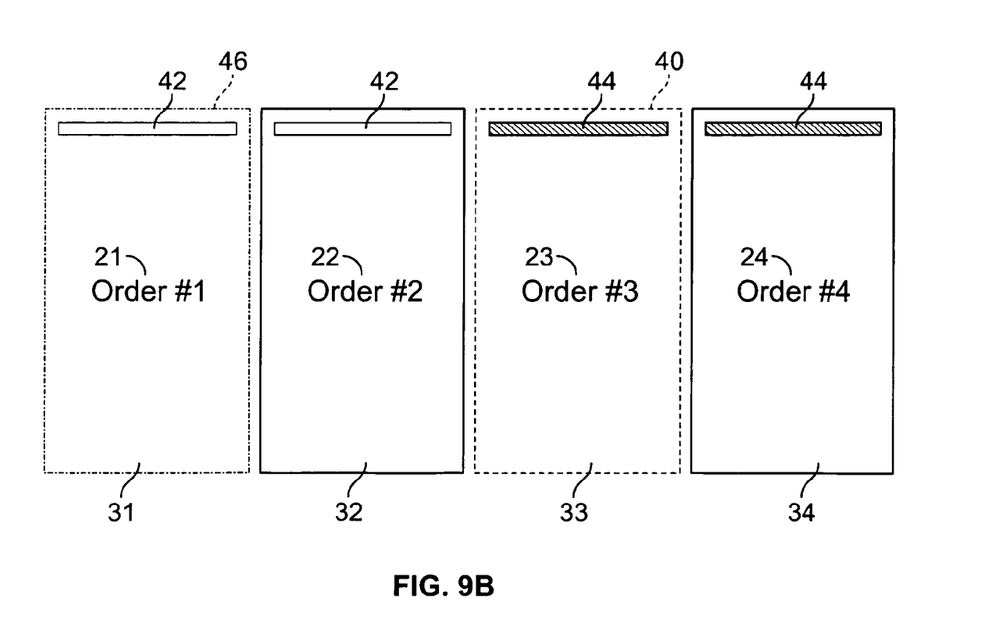

FIG. 9A and FIG. 9B illustrate an embodiment in which an order is modified after it has been assembled. FIG. 9A illustrates the display 13 before order #1 21 is modified and FIG. 9B illustrates the display 13 after the order #1 21 is modified. In FIG. 9A, order #1 21 is in the left position 31, order #2 22 is in the left-center position 32, order #3 23 is in the right-center position 33, and order #4 24 is in the right position 34. Indicator 40 is correlated with order #3 23 indicating that the runner is currently working on the order. Further, indicators 42 are correlated with order #1 21 and order #2 22 indicating that the respective orders have been assembled and are ready to be presented or delivered to the customer. Indicators 44 are correlated with order #3 23 and order #4 24 indicating that the respective orders have not been assembled yet.

The order management system 10 determines that a customer order, such as order #1 21, needs to be modified based on a crew action inputting information to the order management system 10 through the input device 19. In response, the order management system 10 indicates the order is being modified. In FIG. 9B, as compared to FIG. 9A, order #1 21 remains in the left position 31, order #2 22 remains in the left-center position 32, order #3 23 remains in the right-center position 33, and order #4 24 remains in the right position 34. Indicator 42 and indicator 46 are correlated with order #1 21 indicating that the order has been modified. Preferably, indicator 46 is flashing so as to easily draw attention to the display 13. Indicator 40 remains correlated with order #3 23 indicating that the runner is currently working on the order. Further, indicator 42 remains correlated with order #2 22 indicating that the order has been assembled and is ready to be presented or delivered to the customer. Indicators 44 are still correlated with order #3 23 and order #4 24 indicating that the respective orders have not been assembled yet.

While the specific embodiments have been illustrated and described, numerous modifications come to mind without significantly departing from the spirit of the invention, and the scope of protection is only limited by the scope of the accompanying Claims.

What is claimed is:

1. A method for managing a drive-through food product order management system having a display for simultaneous display of customer product orders to a food runner and a food presenter for assembling the customer product orders and for presenting the customer product orders to respective customers, respectively, the drive-through food product order management system further having a food runner input device for performing a food runner bump function and a separate food presenter input device for performing a food presenter bump function, the method comprising the steps of:

transmitting first product order information to a display for displaying the first product order information in a first position on the display for viewing by the food runner and the food presenter, wherein the first product order information is representative of contents of a first customer product order;

transmitting second product order information to the display for displaying the second product order information in a second position on the display for viewing by the food runner and the food presenter, wherein the second product order information is representative of contents of a second customer product order;

correlating a first runner indicator with the first customer product order;

correlating a second runner indicator with the second customer product order;

correlating a first presenter indicator with the first customer product order;

correlating a second presenter indicator with the second customer product order;

transmitting the first runner indicator to the display for displaying the first runner indicator on the display with the first product order information in the first position, wherein the first runner indicator is positioned at a first site relative to the first product order information on the display;

transmitting the second runner indicator to the display for displaying the second runner indicator on the display with the second product order information in the second position, wherein the second runner indicator is positioned at the same site as the first site, relative to the second product order information, on the display for allowing the runner to quickly and easily locate the first and second runner indicators;

transmitting the first presenter indicator to the display for displaying the first presenter indicator on the display with the first product order information in the first position, wherein the first presenter indicator is positioned at a second site different than the first site, relative to the first product order information on the display;

transmitting the second presenter indicator to the display for displaying the second presenter indicator on the display with the second product order information in the second position, wherein the second presenter indicator is positioned at the same site as the second site, relative to the second product order information, on the display for allowing the presenter to quickly and easily locate the first and second presenter indicators, and for allowing the presenter to efficiently differentiate the first and second presenter indicators from the first and second runner indicators;

wherein each of the first and second runner indicators are one of at least 1) an order is currently being assembled indicator indicating that the customer product order is currently being assembled by the runner, 2) an order is not currently being assembled indicator indicating that the customer product order is not currently being assembled, 3) an order has switched positions indicator indicating that the customer product order has switched positions prior to the runner assembling the customer product order; and 4) an order needs to be reassembled indicator indicating that the runner needs to make a modification to an already assembled order;

wherein each of the first and second presenter indicators are one of at least 1) an order is not assembled indicator indicating that the customer product order has not been assembled yet, and 2) an order is assembled indicator indicating that the customer product order has been assembled and is ready to be presented by the presenter;

receiving a runner bump signal from only the food runner input device in response to a food runner bump function being performed from the food runner input device, and in response thereto transmitting updated display signals to the display wherein the first runner indicator is an order is not currently being assembled indicator and the second runner indicator is an order is currently being assembled indicator; and, receiving a presenter bump signal from only the food presenter input device in response to a food presenter bump function being performed from the food presenter input device, and in response thereto transmitting updated display signals to the display wherein:

the first product order information, the first runner indicator, and the first presenter indicator are all deleted from the first position; and the second product order information, the second runner indicator, and the second presenter indicator are all repositioned from to the second position of the display to the first position of the display in the same format relative to one another.

2. The method of claim 1 wherein the first and second runner indicators are each a box surrounding the first and second customer order information, respectively, wherein each box is the same size and located in the same site on the display relative to each of the first and second customer order information on the display, respectively.

3. The method of claim 1 wherein the first and second presenter indicators are each a bar at the top of the first and second customer order information, respectively, wherein each bar is the same size and located in the same site on the display relative to each of the first and second customer order information on the display, respectively.

4. The method of claim 1 further comprising the steps of:

correlating a first additional presenter indicator with the first customer product order;

correlating a second additional presenter indicator with the second customer product order;

transmitting the first additional presenter indicator to the display for displaying the first additional presenter indicator on the display with the first product order information in the first position, wherein the first additional presenter indicator is positioned adjacent to the second site, relative to the first product order information on the display;

transmitting the second additional presenter indicator to the display for displaying the second additional presenter indicator on the display with the second product order information in the second position, wherein the second additional presenter indicator is positioned adjacent to the second site, relative to the second product order information, on the display for allowing the presenter to quickly and easily locate the first and second additional presenter indicators, and for allowing the presenter to efficiently differentiate the first and second additional presenter indicators from the first and second presenter indicators, and from the first and second runner indicators;

wherein each of the first and second third additional runner indicators are one of at least 1) an order has switched display position indicator indicating that the customer product order has switched positions on the display, and 2) an order has been held by the runner indicator indicating that the runner has provided an input to the system to hold the customer product order.

5. The method of claim 1 further comprising the step of:

receiving an additional runner bump signal from the food runner input device and in response thereto transmitting additional updated display signals to the display wherein the second runner indicator is now an order is not currently being assembled indicator, and the first runner indicator is now an order is currently being assembled indicator.

6. The method of claim 5 further comprising the step of:

receiving a first order modification signal after the second customer order has been assembled, and in response thereto transmitting additional updated display signals to the display wherein the second runner indicator is now an order needs to be reassembled indicator.

7. The method of claim 1 wherein each of the order is currently being assembled indicator, the order is not currently being assembled indicator, the order has switched positions indicator, and the order needs to be reassembled indicator are represented on the display as a different color from one another.

8. The method of claim 1 wherein each of the order is not assembled indicator and the order is assembled indicator are represented on the display as a different color from one another.

9. The method of claim 1 wherein the order is not being assembled indicator is the same color as the background color of the display screen for the customer product order to which the order is not being assembled indicator relates.

* * * * *